United States Patent
Pyron

(10) Patent No.: US 6,838,615 B2
(45) Date of Patent: Jan. 4, 2005

(54) GLIDE ASSEMBLY FOR CONDUIT BODIES

(75) Inventor: Roger Pyron, Bartlett, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 392 days.

(21) Appl. No.: 10/043,084

(22) Filed: Jan. 9, 2002

(65) Prior Publication Data

US 2002/0096347 A1 Jul. 25, 2002

Related U.S. Application Data

(60) Provisional application No. 60/263,864, filed on Jan. 24, 2001.

(51) Int. Cl.[7] .................................. H02G 3/08
(52) U.S. Cl. ................... 174/50; 174/49; 174/60; 174/68.3; 439/582; 248/300; 220/3.2
(58) Field of Search ................ 174/48, 49, 50, 174/60, 65 R, 68.1, 68.3; 439/582, 610, 456; 248/300; 220/3.2, 3.8

(56) References Cited

U.S. PATENT DOCUMENTS

| | | |
|---|---|---|
| 2,946,560 A | 7/1960 | Ferm |
| 3,037,744 A | 6/1962 | Cooper |
| 3,038,702 A | 6/1962 | Trunnell |
| 3,139,480 A * | 6/1964 | Deslodge ................ 174/65 R |
| 4,132,665 A | 1/1979 | Nelson |
| 4,541,615 A | 9/1985 | King, Jr. |
| 4,801,118 A * | 1/1989 | Wium ..................... 248/300 |
| 4,946,137 A | 8/1990 | Adamczek |
| 4,951,923 A | 8/1990 | Couture |
| 5,029,817 A | 7/1991 | Tamm |
| 5,236,177 A | 8/1993 | Tamm |
| 5,271,605 A | 12/1993 | Damron |
| 5,560,655 A | 10/1996 | Cameron |
| 5,654,526 A | 8/1997 | Sharp |
| D401,907 S | 12/1998 | Gazerro |
| D445,765 S | 7/2001 | Wojcik |
| 6,271,476 B1 | 8/2001 | Bobowick et al. |
| 6,388,193 B2 | 5/2002 | Maynard et al. |
| D463,377 S | 9/2002 | Canty |
| 6,452,096 B1 | 9/2002 | Childers |
| 6,580,029 B1 * | 6/2003 | Bing ......................... 174/48 |
| 6,586,680 B1 | 7/2003 | Nelson |

* cited by examiner

Primary Examiner—Dhiru R Patel
(74) Attorney, Agent, or Firm—Hoffmann & Baron, LLP

(57) ABSTRACT

A conduit body assembly includes an elongate sidewall, at least one hub and a glide member. The conduit body has an open upper end, a closed lower end, and a conduit body interior. The hub extends from the body in communication with the body interior and defines an access port for passage of wire therethrough. The glide member is arranged within the body interior adjacent to the access port for providing reduced frictional engagement with wire passing through the access port.

21 Claims, 4 Drawing Sheets

GLIDE ASSEMBLY FOR CONDUIT BODIES

This application claims the benefit of U.S. Provisional Application Serial No. 60/263,864 filed Jan. 24, 2001.

FIELD OF THE INVENTION

The present invention relates generally to a conduit body containing electrical wires and more particular to a conduit body having a glide assembly that reduces friction associated with wires being pulled through the conduit body.

BACKGROUND OF THE INVENTION

Electrical conduit systems are required in order to safely provide electric power to homes, commercial buildings, and the like. These conduit systems often include long runs of rigid electrical conduits with frequent changes in direction, such as 90° turns, and interruptions with various couplings to accommodate bends or changes in direction. The conduits themselves serve to provide a protective housing for the wires therein and to route these wires throughout the building or other installation as required. Conduits are typically constructed of a rigid metal pipe.

Conduit bodies are often installed in the conduit systems at various locations to provide accesses to the wires in the conduits, or to route the wires through a bulkhead, an electrical equipment enclosure, a junction box, or other electrical fixture. Conventional conduit bodies can have openings at one or more ends as well as through the upper and lower walls.

Typically, wires are inserted through an opening on the bottom or side of the conduit body and out through another opening located along another side or top of the conduit body. The friction caused by rubbing of the wires against the edges of the hub access port of the conduit body makes it difficult to pull the wire through the conduit housing, especially if there are many bends along the conduit length. While power pullers are used for this purpose, it is not unusual for the puller cords to break, leaving a partially pulled wire end that is very difficult to access within the conduit. In addition, the friction of the wire insulation rubbing against the edges of openings of the conduit body may damage the insulation on the wires.

Attempts to minimize such friction associated with the rubbing of wires against the openings of conduit bodies have been less than satisfactory. For instance, some manufacturers have inserted roller pins and smooth shields to minimize the friction. However, these attempts to minimize such friction do not satisfactorily address the problem.

Accordingly, it is desirable to reduce the friction associated with wires rubbing against the inside of the openings of a conduit body.

SUMMARY OF THE INVENTION

The present invention, which addresses the needs of the prior art, relates to a conduit body assembly including an elongate sidewall, at least one hub, and a glide member. The conduit body has an open upper end, a closed lower end, and a conduit body interior. The hub extends from the body in communication with the body interior and defines an access port for passage of wire therethrough. The glide member is arranged within the body interior adjacent to the access port for providing reduced frictional engagement with wire passing through the access port.

In a further aspect of the invention, a conduit body assembly is provided including an elongate sidewall, a lower wall, a plurality of hubs, a plurality of glide bar holders, and at least one lubricious glide bar. The sidewall has an upper end and a lower end. The upper end has a rim along a perimeter thereof and defines a conduit body opening. The lower wall is connected to the lower end of the sidewall. Each hub extends from one of either the sidewall or the lower wall and defines an access port. The glide bar holders each include a pair of opposed U-shaped members connected to an interior of the sidewall proximate to one of the access ports. Each glide bar is configured so as to be releasably attachable to an associated glide bar holder.

The present invention also relates to a method of pulling wires through a conduit body, where the conduit body includes an elongate sidewall having an open upper end, a closed lower end, and a conduit body interior, at least one hub extending from the body in communication with the body interior and defining an access port for passage of wire therethrough, at least one glide bar supported by said sidewall, and at least one pair of glide bar holders on said sidewall. The method includes the steps of: placing a glide bar over a glide bar holder, wherein the glide bar holder includes a pair of opposed protrusions connected to the conduit body interior proximate to the access port for wires and the glide bar includes a U-shaped member having lips at ends thereof that may be urged over the glide bar holder; and pulling the wire through the access port of the conduit body into the conduit body interior.

With the foregoing and additional features in mind, this invention will now be described in more detail, and other benefits and advantages thereof will be apparent from the following detailed description when taken in conjunction with the accompanying drawings, in which like elements are identically numbered throughout the several views.

DETAILED DESCRIPTION OF THE PREFERRED EMBODIMENT

The present invention provides a conduit body assembly for use in electrical systems such as electrical conduit systems through which it is often difficult to pull wires without causing damage to the wire itself or the insulation surrounding the wire. The conduit body assembly of the present invention provides a conduit body having an access port or ports through which wires may be pulled. A glide member is provided proximal to the access port of a hub through which a wire or wires are to be pulled so that rather than risk being damaged or abraded by rough edges of the access port, the wire slides over a glide that is smooth.

In a preferred aspect of the invention, the glide assembly is arranged in the conduit body and includes a glide bar releasably attached to a pair of glide bar holders such that the pulling action on the wires helps secure the glide member onto the glide bar holders.

In further desirable aspect of the invention, the glide bar prevents access of the wires to a rough edge of the access port.

Figure 1:
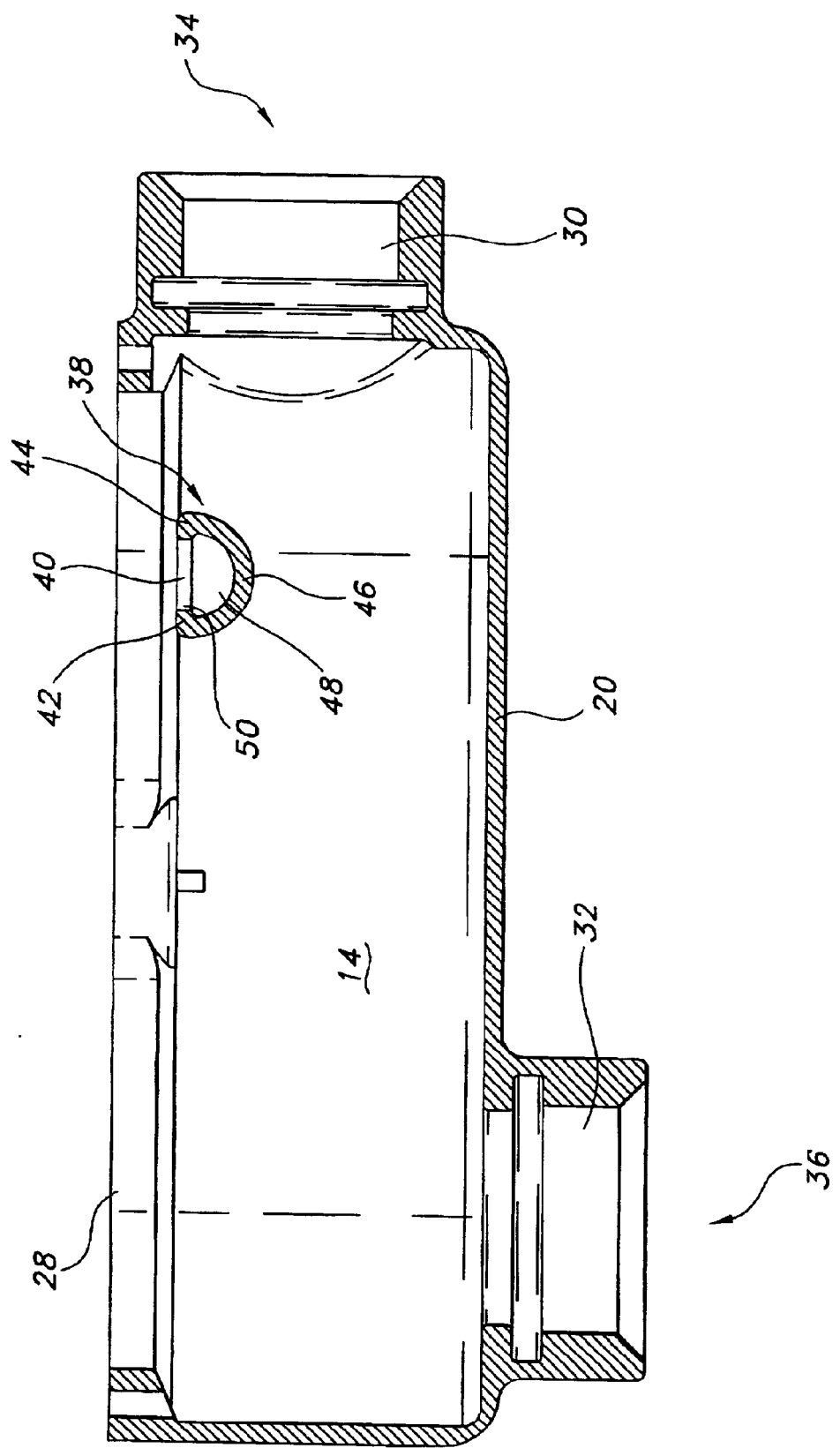
FIG. 1 is a cross-sectional view of the conduit body assembly of the present invention.

Referring to FIG. 1, a cross sectional view of the conduit body with glide assembly of the present invention is shown. Conduit body assembly 10 includes an elongate generally tubular member or conduit body 12, openings 34 and 36 for wires (not shown) and glide assembly 42.

Conduit body 12 is an elongate generally tubular shaped member including an upwardly extending sidewall 14 having an open upper end 16 and a closed lower end 18. The lower end 18 of sidewall 14 perimetrically bounds a lower wall 20 of the conduit body 12. The sidewall 14 and lower wall 20 together define a conduit body interior 22. The interior 22 may be enclosed by cover 14 over open upper end 16. Sidewall 14 defines at the open upper end 16 a generally oval-shaped smooth planar rim 24. Rim 24 includes at its opposite ends a pair of inwardly directed lips 23, as shown in FIGS. 2A and 2B.

Conduit body 12 further includes a pair of tubular projections or hubs 30 and 32 extending outwardly from conduit body interior 22. Hubs 30 and 32 are in communication with conduit body interior 22 and serve as points of attachment for conduits (not shown). Each hub 30 and 32 ends in a circular opening or access port, 34 and 36, respectively. Access ports 34 and 36 have an inner diameter substantially equal to an outer diameter of an exterior of a conduit (not shown) so as to accommodate a conduit therein. The conduits may be attached to the conduit body 12 in any conventional manner, including but not limited to via an adhesive, a bonding agent or a mechanical device, such as a male/female threading.

Figure 2B:
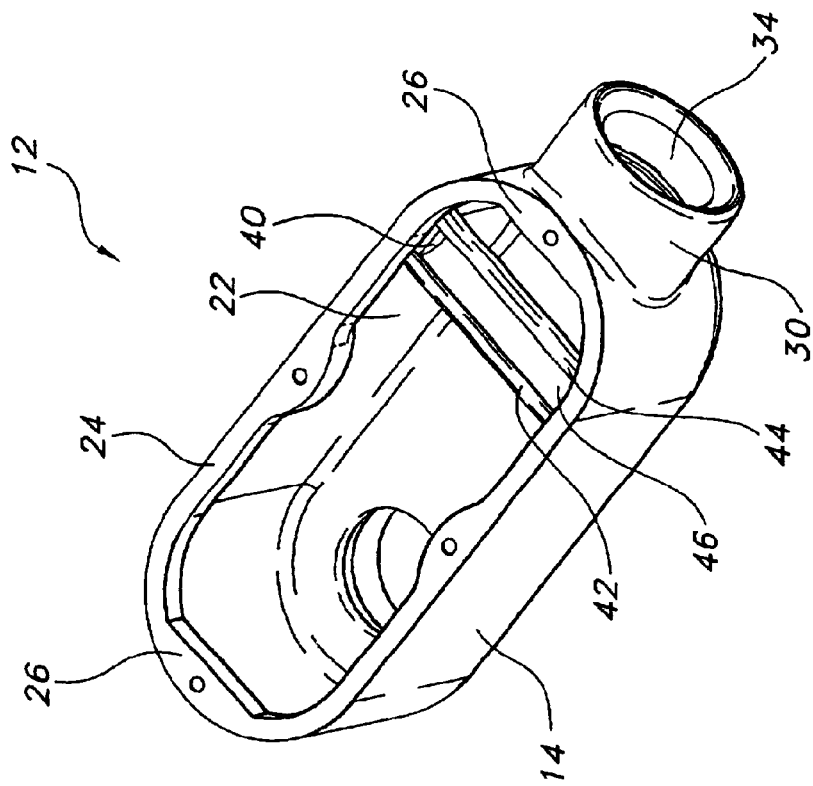
FIG. 2B is a perspective view of the top of the conduit body assembly of the present invention according to FIG. 2A, showing a glide bar in place over the glide bar holder.
Figure 2A:
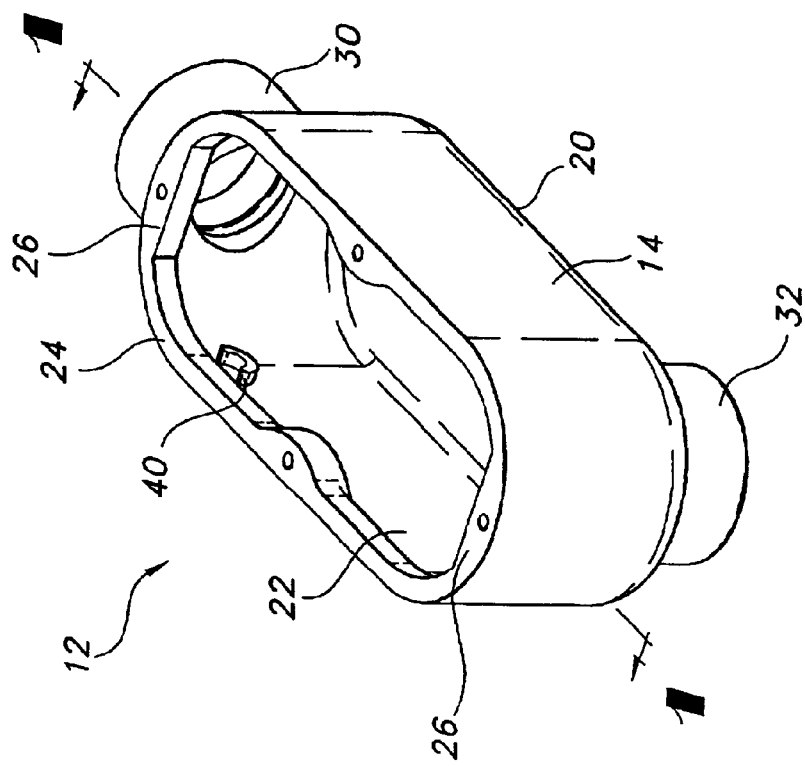
FIG. 2A is a perspective view of the top of the conduit body assembly of the present invention showing an embodiment of a glide bar holder.

FIGS. 2A and 2B are perspective top views showing the glide assembly 38 of the present invention. In FIG. 2A, a glide bar holder 40 is shown. In this preferred aspect, the glide bar holder 40 is a pair of U-shaped members placed on opposed portions of the sidewall 14. Referring now to FIG. 2B, a glide assembly 38 is shown including a glide bar 46 and glide bar holder 40. The glide bar holder 40 is capable of securing the glide bar 46 to conduit body 12. In particular, glide bar lips 42 and 44 effectively hold glide bar 46 to conduit body 12 by snapping into place onto glide bar holder 40. As seen in FIG. 1, an alternative aspect of the glide bar holder 40 is shown as a protruding member 48 having an indentation 50 over which the glide bar lips 42 and 44 can be releasably connected. In a preferred aspect of the present invention, the glide bar holder 40 includes a pair of protruding members opposed to one another on the sidewall 14. The glide bar 46 can be releasably connected to both protruding members 40 for added support during use of the conduit body assembly 10. Other configurations and locations of a glide bar holder 40 which effectively secure the glide bar 46 in place and protect wires are contemplated, but not shown.

Referring again to FIG. 2B, the glide assembly 38 is shown in a conduit body 12 according to the present invention. The glide assembly 38 can be used in the following manner. Wire (not shown) will enter the conduit body 12, for example, through access port 34 of hub 30. The wire will be pulled under glide bar 46 and out through open upper end 16. Any wire attachment or other required electrical work is then performed. A cover (not shown) or other appropriate piece may be placed over the upper end 16 upon completion of the work.

Figure 3:
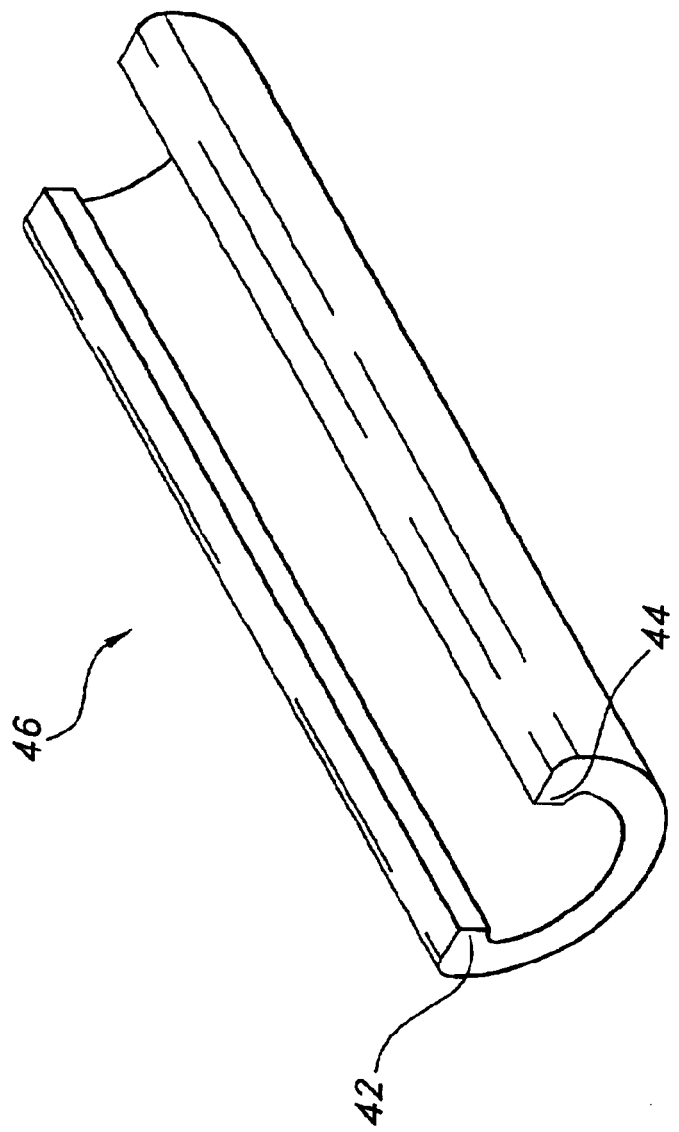
FIG. 3 is a perspective view of a glide bar for a conduit body assembly of the present invention.

Desirably, glide bar 46 is an elongate smooth, U-shaped structure having lips 42 and 44 on the open ends of the U-shape as shown in FIG. 3. Other configurations of glide bar 46 that facilitate the sliding of wires through a conduit body 12 with minimal friction are contemplated, but not shown.

Figure 4:
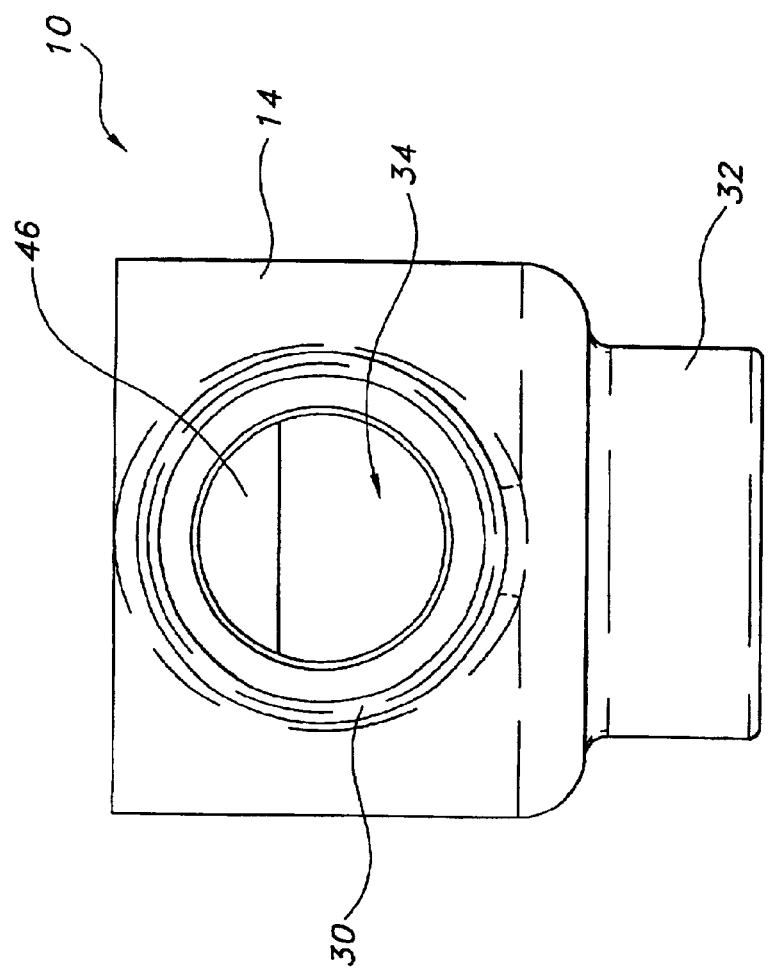
FIG. 4 is a side view of the conduit body assembly of the present invention.

Referring now to FIG. 4, a side view of the conduit body assembly of the present invention is shown. In this view, a section of glide bar 46 can be seen through side opening 25. Thus, glide bar 46 limits access of wires (not shown) to an upper edge of the hub 30 over which wires would normally be pulled. As a result, the wires glide past a smooth surface of the glide bar 46 and avoid risk of contact with rough edges or excess friction when being pulled into the conduit body 12.

The design of the glide assembly 38 of the present invention allows for wires to be pulled directly through the conduit with minimal friction caused by the wires rubbing against the inside edges of the hub 30. As wires are pulled through the conduit body 12, they tend to bend and rub against the inside edges of the hub 30. Glide bar 46 is located in the conduit body 12 so that wires rub against it rather than the conduit body 12. Thus, glide bar 46 of the present invention minimizes the friction associated with pulling the wires through the conduit body and facilitates the movement of the electrical wires through the conduit body 12. Additionally, the glide bar 46 of the present invention protects wires from damage that may be caused by the wires rubbing against the inside edges of the body 12. Once the movement of wires through the conduit body 12 ceases, the glide bar 46 maybe snapped out of its holder 40 and removed from the conduit body 12 for reuse in a next installation or may be discarded.

Desirably, the glide bar 46 is of a lubricious nature. Desirable materials for the glide bar 46 include, but are not limited to, nylon, polyethylene terephthalate (PET), polytetrafluoroethylene (PTFE), and the like. Most desirably, the glide bar 46 is a self-lubricating material such as PTFE.

Referring again to FIG. 1, conduit body assembly 10 may also provide a cover 28 that is positionable over open upper end 16 of the conduit body 12. Cover 28 has a smooth, essentially uninterrupted surface that conforms to the rim 24 of the upper end 16. Desirably, cover 28 has an oval-like shape corresponding to that of conduit body 12. The cover 28 may be transparent for easy viewing of inside cavity 21.

The conduit body 10 and cover 28 are desirably made of a metallic material, non-metallic material or a combination thereof. Useful metallic materials include aluminum, steel and the like. Useful non-metallic materials include polyvinyl chloride, nylons, high density polyethylene and combinations thereof. The cover 28 and conduit body 12 may be a vacuum form plastic member.

It will be apparent that the present invention has been described herein with reference to certain preferred or exemplary embodiments. The preferred or exemplary embodiments described herein may be modified, changed, added to, or deviated from without departing from the intent, spirit and scope of the present invention, and it is intended that all such additions, modifications, amendments and/or deviations be included within the scope of the following claims.

What is claimed is:

1. A conduit body assembly, comprising:
   a conduit body including an elongate sidewall having an open upper end, a closed lower end, and a conduit body interior;
   at least one hub extending from said body in communication with said body interior, said hub defining an access port for passage of wire therethrough; and
   least one glide bar supported by said sidewall.

2. The conduit body assembly according to claim 1, wherein said glide means further includes a pair of opposed glide bar holders on said sidewall for supporting said glide bar across said access port.

3. The conduit body according to claim 2, wherein said glide bar comprises an elongate U-shaped member having inwardly turned lips at ends thereof.

4. The conduit body assembly according to claim 3, wherein said glide bar holder comprises a pair of opposed U-shaped members, wherein said lips of said glide bar may be urged over said pair of opposed U-shaped members, said holder being configured so as to be releasably attachable to said pair of opposed U-shaped members.

5. The conduit body assembly according to claim 3, wherein said holder is formed of a lubricious material.

6. The conduit body assembly according to claim 5, wherein said glide lubricious material is selected from the group consisting of nylon, polyethylene terephthalate, and polytetrafluoroethylene.

7. The conduit body assembly according to claim 1, wherein said conduit body is formed from a metallic material.

8. The conduit body assembly according to claim 7, wherein said metallic material is selected from the group consisting of steel and aluminum.

9. The conduit body according to claim 1, wherein said conduit body is formed from a non-metallic material.

10. The conduit body assembly according to claim 9, wherein said non-metallic material is selected from the group consisting of a polyvinyl chloride, a nylon, and a high density polyethylene.

11. The conduit body assembly according to claim 1, further comprising a cover positionable over said upper end of said conduit body.

12. The conduit body assembly according to claim 11, wherein said open upper end of said sidewall comprises a rim, said cover includes an essentially uninterrupted surface which conforms to said rim of said conduit housing.

13. The conduit body assembly according to claim 12, wherein said cover is formed from a transparent material.

14. The conduit body assembly according to claim 11, wherein said conduit body and said cover are made of vacuum form of plastic.

15. A conduit body assembly, comprising:
    a conduit body including an elongate sidewall having an upper end and a lower end, wherein said upper end has a rim along a perimeter thereof defining a conduit body opening;
    a lower wall connected to said lower end of said sidewall;
    a plurality of hubs, each hub extending from one of said sidewall and said lower wall, said hub defining an access port;
    a plurality of glide bar holders, wherein each holder includes a pair of opposed U-shaped members connected to an interior of said sidewall proximate to one of said access ports; and
    at least one lubricious glide bar configured so as to be releasably attachable to said glide bar holder.

16. The conduit body according to claim 15, wherein said glide bar comprises a U-shaped member having lips at ends thereof, wherein said lips may be urged over a corresponding glide bar holder.

17. The conduit body assembly according to claim 15, wherein said plurality of hubs comprises a first hub on a curved portion of said sidewall and a second hub on said lower wall distal from said first hub.

18. The conduit body assembly according to claim 17, wherein said glide bar is made from polytetrafluoroethylene.

19. A method of pulling wire through a conduit body, wherein said conduit body includes an elongate sidewall having an open upper end, a closed lower end, and a conduit body interior, at least one hub extending from said body in communication with said body interior, said hub defining an access port for passage of wire therethrough, at least one pair of opposed glide bar holders on said sidewall and at least one glide bar supported by said glide bar holders, said method comprising the steps of:
    placing said glide bar over said glide bar holder, wherein said glide bar holder includes a pair of opposed protrusions connected to said conduit body interior proximate to said access port for wires, and said glide bar includes a U-shaped member having lips at ends thereof, wherein said lips may be urged over said glide bar holder; and
    pulling said wire through said access port of said conduit body into said conduit body interior.

20. The method according to claim 19, further comprising the step of removing said glide bar after said pulling step.

21. The method according to claim 19, further comprising the step of placing a second glide bar over a second glide bar holder before said pulling step.

* * * * *

UNITED STATES PATENT AND TRADEMARK OFFICE
CERTIFICATE OF CORRECTION

PATENT NO. : 6,838,615 B2
DATED : January 4, 2005
INVENTOR(S) : Roger Pyron

It is certified that error appears in the above-identified patent and that said Letters Patent is hereby corrected as shown below:

Column 4,
Line 60, reads "...least one glide bar..." but should read -- ...at least one glide bar... --.

Column 5,
Line 10, reads "...wherein said glide lubricious material..." but should read
-- ... wherein said lubricious material... --.

Signed and Sealed this

Third Day of May, 2005

JON W. DUDAS
*Director of the United States Patent and Trademark Office*